US008799949B2

(12) United States Patent
Park

(10) Patent No.: US 8,799,949 B2
(45) Date of Patent: Aug. 5, 2014

(54) METHOD AND APPARATUS FOR PROVIDING BROADCASTING SERVICE FOR DIFFERENT TYPES OF WIRELESS COMMUNICATION SYSTEMS

(75) Inventor: Dae-Geun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 365 days.

(21) Appl. No.: 13/010,367

(22) Filed: Jan. 20, 2011

(65) Prior Publication Data
US 2012/0066717 A1  Mar. 15, 2012

(30) Foreign Application Priority Data
Sep. 10, 2010 (KR) ........................ 10-2010-0088882

(51) Int. Cl.
*H04N 5/445* (2011.01)
*H04N 7/16* (2011.01)
(52) U.S. Cl.
CPC .................................. *H04N 5/445* (2013.01)
USPC ................................ 725/39; 725/62; 725/81
(58) Field of Classification Search
CPC .................................................... H04N 5/445
USPC .......................................................... 725/39
See application file for complete search history.

(56) References Cited

U.S. PATENT DOCUMENTS

| 2002/0069278 | A1* | 6/2002 | Forslow ........................ 709/225 |
| 2004/0068668 | A1* | 4/2004 | Lor et al. ...................... 713/201 |
| 2005/0221824 | A1* | 10/2005 | Lee et al. .................. 455/435.2 |
| 2007/0050820 | A1* | 3/2007 | Saarikivi et al. ................ 725/62 |
| 2008/0282299 | A1* | 11/2008 | Koat et al. ........................ 725/93 |
| 2009/0044228 | A1* | 2/2009 | Balageas et al. ................ 725/48 |
| 2009/0322511 | A1 | 12/2009 | McKenna et al. |

FOREIGN PATENT DOCUMENTS

| KR | 10-2005-0098200 | 10/2005 |
| KR | 10-0624243 | 9/2006 |
| KR | 1020090039223 | 4/2009 |
| KR | 1020100065005 | 6/2010 |

OTHER PUBLICATIONS

Rapporteur, Q.14/13, "Q.14/13 Meeting Report," International Telecommunication Union, Telecommunication Standardization Sector, Study Period 2009-2012, Study Group 13, TD166 (WP 2/13) (2010).

* cited by examiner

*Primary Examiner* — Kieu Oanh T Bui
(74) *Attorney, Agent, or Firm* — Nelson Mullins Riley & Scarborough LLP

(57) ABSTRACT

An apparatus for providing identical broadcasting contents to wireless communication access networks using different wireless access technologies includes: a broadcasting service request processing device configured to receive a broadcasting service initiation request from a subscriber terminal and feed back an authentication result regarding a requested service; a subscriber authentication processing interface device configured to perform an authentication function regarding a broadcasting service requested by a subscriber through connection with an external authentication server; a contents broadcasting control device configured to identify a broadcasting service area based on the broadcasting service request of the subscriber terminal, when authentication has been normally finished, and broadcasting contents corresponding to the broadcasting service area and control transmission of the broadcasting contents using address information necessary to deliver the broadcasting contents; and a broadcasting service area configuration information storage device configured to store predetermined broadcasting service area information.

12 Claims, 6 Drawing Sheets

METHOD AND APPARATUS FOR PROVIDING BROADCASTING SERVICE FOR DIFFERENT TYPES OF WIRELESS COMMUNICATION SYSTEMS

CROSS-REFERENCE(S) TO RELATED APPLICATIONS

The present application claims priority of Korean Patent Application No. 10-2010-0088882, filed on Sep. 10, 2010, which is incorporated herein by reference in its entirety.

BACKGROUND OF THE INVENTION

1. Field of the Invention

Exemplary embodiments of the present invention relate to a method and an apparatus for providing a broadcasting service; and, more particularly, to a method and an apparatus for providing a broadcasting service for different types of wireless communication systems by grouping wireless communication access networks, in which different wireless access technologies are used, into a broadcasting service area, in which the same broadcasting contents are provided, and managing the broadcasting service area in order to provide an efficient broadcasting service.

2. Description of Related Art

Broadcasting contents have been delivered in a unicast type so far in various wireless access systems, such as Mobile WiMAX and LTE (Long Term Evolution). However, considering the increasing number of channels and quality of contents, the amount of available radio resources is limited, and the cost for using them is very high. Therefore, continued delivery of broadcasting contents based on unicast is limited.

For these reasons, various types of broadcasting specifications have recently been proposed to efficiently provide broadcasting contents through a broadcasting or multicast service even in wireless access systems, such as E-MBS (Enhanced-Multicast Broadcast Service) of Mobile WiMAX and e-MBMS (enhanced-Multimedia Broadcast Multicast Service) of LTE.

In the case of E-MBS proposed by IEEE802.16e or IEEE802.16m, wireless network access nodes (base station devices) are arranged into a number of logic groups to establish a single broadcasting area. In such broadcasting areas, the same data is transmitted through resource intervals accessible by all terminals (macro-diversity is used), for example, to improve the transmission rate and service reception quality. The e-MBMS proposed by LTE has a similar configuration.

However, these types of broadcasting techniques are not applied to wireless networks using different wireless access technologies, but are limitedly applied to access nodes using the same wireless access technology.

Specifically, considering that a large number of network businesses are simultaneously operating various types of wireless access networks nowadays, it is necessary to develop an operating system for establishing broadcasting service areas regardless of wireless access technologies used in wireless access networks and providing broadcasting contents in each of the established broadcasting service areas.

SUMMARY OF THE INVENTION

An embodiment of the present invention is directed to a method and an apparatus for providing a broadcasting service in different types of wireless communication systems, where different types of wireless access networks coexist, by arranging the different types of wireless access networks into a number of broadcasting service areas and configuring and controlling the broadcasting service areas so that, in the same broadcasting service area, the same broadcasting contents are provided even if wireless access networks belong to the area use different wireless access technologies.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for providing identical broadcasting contents to wireless communication access networks using different wireless access technologies includes: a broadcasting service request processing device configured to receive a broadcasting service initiation request from a subscriber terminal and feed back an authentication result regarding a requested service; a subscriber authentication processing interface device configured to perform an authentication function regarding a broadcasting service requested by a subscriber through connection with an external authentication server; a contents broadcasting control device configured to identify a broadcasting service area based on the broadcasting service request of the subscriber terminal, when authentication has been normally finished, and broadcasting contents corresponding to the broadcasting service area and control transmission of the broadcasting contents using address information necessary to deliver the broadcasting contents; and a broadcasting service area configuration information storage device configured to store predetermined broadcasting service area information.

The apparatus may further include a broadcasting service information transmission control device configured to broadcast information regarding broadcasting programs to be broadcasted to each broadcasting service area and channels.

The information regarding broadcasting programs to be broadcasted to each broadcasting service area and channels is EPG (Electronic Program Guide) information.

The predetermined broadcasting service area information stored in the broadcasting service area configuration information storage device includes a broadcasting service area ID, an access node type of a wireless access network, an access node ID, a broadcasting program ID in the broadcasting service area, and a broadcasting program IP address.

In accordance with an embodiment of the present invention, a method for providing a broadcasting service by a broadcasting service provision device configured to provide identical broadcasting contents to wireless communication access networks using different wireless access technologies includes: receiving, by the broadcasting service provision device, EPG information to be used in a corresponding broadcasting service area from an external EPG server, and modifying and generating the EPG information into a type suited to a service delivery network: broadcasting, by the broadcasting service provision device, the EPG information to the corresponding broadcasting service area through the service delivery network: transmitting, by the broadcasting service provision device, broadcasting contents to the corresponding broadcasting service area; receiving an initiation request message regarding a broadcasting service from a subscriber terminal and performing, by the broadcasting service provision device, an authentication procedure of the broadcasting service initiation request message applied from an access node controller of the service delivery network; allocating, by the access node controller, a message allowing radio resource allocation for wireless channel connection establishment of the subscriber terminal to an access node after the authentication procedure is finished and starting resource management for channel management of the subscriber terminal; delivering, by the access node, the EPG information and wireless channel connection ID information enabling access to the broadcasting contents to the subscriber terminal under the control of the access node controller so that broadcasting service channel connection is established; and selecting the broadcasting contents as desired, by the subscriber terminal, using the wireless channel connection ID information received from the access node and receiving the broadcasting contents.

Said broadcasting, by the broadcasting service provision device, the EPG information to the corresponding broadcasting service area through the service delivery network may include: transmitting, by the broadcasting service provision device, the generated EPS information to a predetermined access node controller in the corresponding broadcasting service area; relaying, by the access node controller, the EPG information received from the broadcasting service provision device to access nodes supposed to use the EPG information; and converting, by an access node which has received the EPS information, into a data format recognizable by a subscriber terminal and broadcasting to the subscriber terminal.

The EPG information may include broadcasting program information, a multicast IP, and a broadcasting service area ID.

Said transmitting, by the broadcasting service provision device, broadcasting contents to the corresponding broadcasting service area may include: determining the type of contents to be provided to the corresponding broadcasting service area based on information recorded in a broadcasting service area configuration information storage device by a contents broadcasting control device of the broadcasting service provision device; controlling, by the contents broadcasting control device, the broadcasting contents transmission device to transmit broadcasting contents confirmed based on the information recorded in the broadcasting service area configuration information storage device to the corresponding broadcasting service area in which a service request has occurred; and receiving, by the broadcasting contents transmission device, the confirmed broadcasting contents from an external contents server and transmitting the contents to the corresponding broadcasting service area through the service delivery network.

The message used by the subscriber terminal to inform of an initiation request regarding a broadcasting service may include a subscriber ID, a terminal ID, and an access node ID.

Said receiving an initiation request message regarding a broadcasting service from a subscriber terminal and performing, by the broadcasting service provision device, an authentication procedure of the broadcasting service initiation request message applied from an access node controller of the service delivery network may include: requesting, by the broadcasting service provision device, an AAA (Authentication, Authorization, Account) server to authenticate a subscriber ID, a terminal ID, and a requested service type of the broadcasting service initiation request message from the access node controller; and informing the subscriber terminal of an authentication result by the broadcasting service provision device in the case of successful authentication of the service request of the subscriber terminal.

In accordance with an embodiment of the present invention, a method for configuring a broadcasting service area by a broadcasting service provision device configured to provide identical broadcasting contents to wireless communication access networks using different wireless access technologies includes: requesting, by the broadcasting service provision device, all access node controllers managed by the device to provide information regarding access nodes, to which the device can provide a service, when initial configuration or readjustment of a broadcasting service area is necessary; collecting, by the access node controller, the ID of access nodes managed by the controller and the type of wireless access technology of access nodes at the request of the broadcasting service provision device and delivering the collected ID and type to the broadcasting service provision device; establishing, by the broadcasting service provision device, a broadcasting service area automatically according to a predetermined policy based on information received from the access node controller; configuring and storing, by the broadcasting service provision device, information regarding the established broadcasting service area; and providing, by the broadcasting service provision device, the access node controller with the configured and stored information regarding the broadcasting service area.

The information regarding the broadcasting service area provided to the access node controller by the broadcasting service provision device includes: a broadcasting service area ID indicating, by an identification value, a broadcasting area, into which a number of access nodes are grouped, and in which identical contents are provided at identical time; an access node type indicating, by a predetermined value, wireless access technology used by an access node belonging to a specific broadcasting service area; an access node ID indicating a value specific to each access node so that an access node belonging to a specific broadcasting service area is identified; a program ID indicating broadcasting contents provided in a corresponding broadcasting service area; and program IP information corresponding to a delivery address for delivering respective broadcasting contents to a subscriber terminal.

DESCRIPTION OF SPECIFIC EMBODIMENTS

Figure 1:
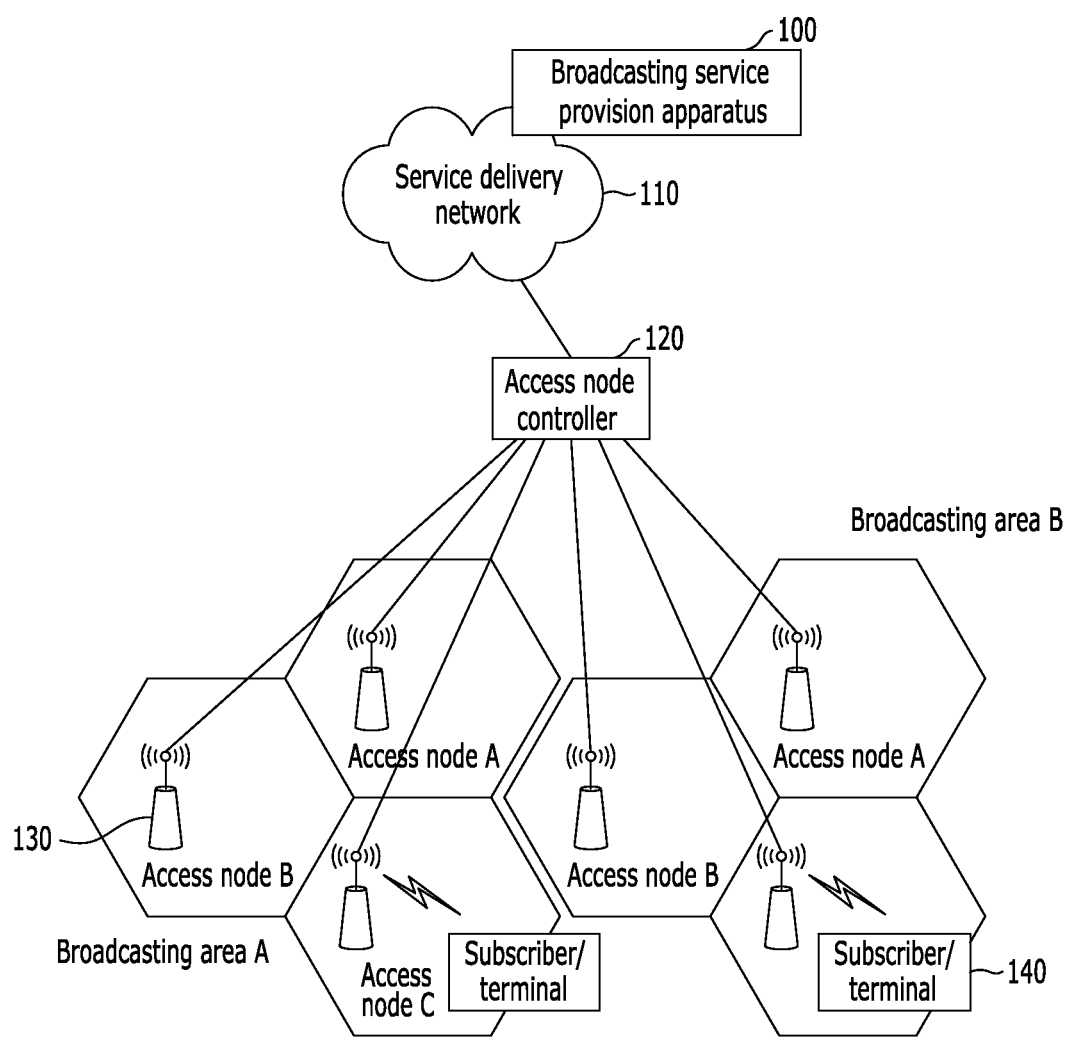
FIG. 1 illustrates an exemplary configuration of a broadcasting service area including different types of wireless access networks proposed by a method for providing a broadcasting service for different types of wireless communication systems in accordance with the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention is directed to a method and an apparatus for providing a broadcasting service for different types of wireless communication systems, which include different types of networks using different wireless access technologies, by grouping the different types of wireless access networks into a number of broadcasting areas and managing them. This does not mean that some access networks of an entire broadcasting system are temporarily configured as a single broadcasting service area, but that a number of access nodes using different types of wireless access technologies are configured as a broadcasting service area.

The present invention is also directed to a method and an apparatus for providing a broadcasting service for different types of wireless communication systems, which include different types of wireless access networks, by grouping the different types of wireless access networks into a number of broadcasting service areas and managing them, as well as providing a function of establishing such broadcasting service areas. Specifically, the same broadcasting contents are always transmitted through all access nodes included in a broadcasting service area in accordance with the present invention, so that a subscriber can use a desired access node without a separate control procedure or an access node suitable for the terminal in use.

Prior to describing the detailed construction of a broadcasting service provision apparatus 100 in accordance with the present invention, the construction of a broadcasting service system, in which a broadcasting service for different types of wireless communication systems proposed by the present invention is performed under the control of the broadcasting service provision apparatus 100, will now be described with reference to FIGS. 1 and 2.

FIG. 1 illustrates an exemplary configuration of a broadcasting service area including different types of wireless access networks proposed by a method for providing a broadcasting service for different types of wireless communication systems in accordance with the present invention. FIG. 2 illustrates another exemplary configuration of a broadcasting service area including different types of wireless access networks proposed by a method for providing a broadcasting service for different types of wireless communication systems in accordance with the present invention.

Figure 2:
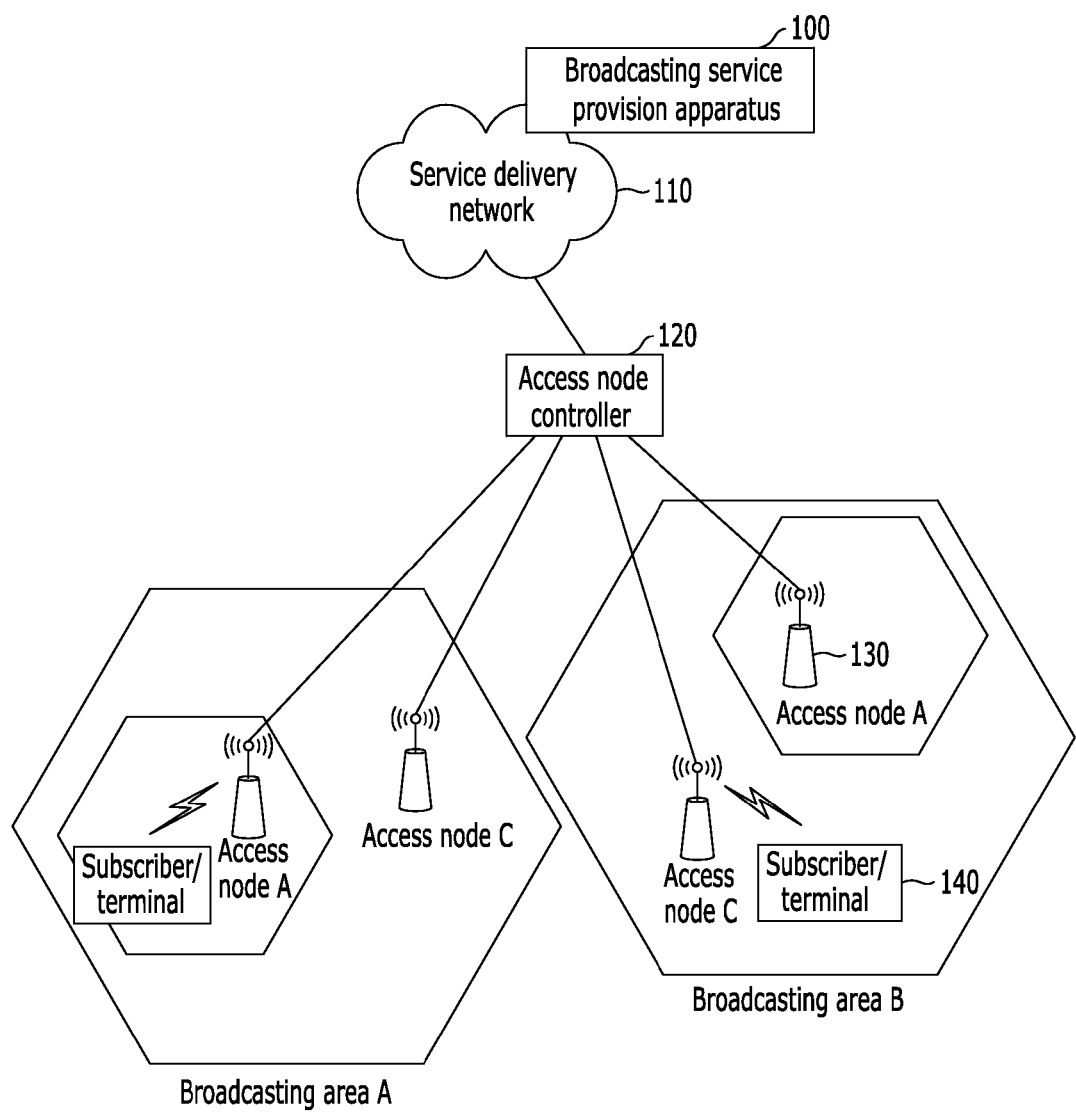
FIG. 2 illustrates another exemplary configuration of a broadcasting service area including different types of wireless access networks proposed by a method for providing a broadcasting service for different types of wireless communication systems in accordance with the present invention.

Referring to FIGS. 1 and 2, FIG. 1 shows the configuration of a broadcasting service area having no overlapping cell coverage, and FIG. 2 shows a broadcasting service system including a broadcasting service area having overlapping cell coverage.

As illustrated in FIGS. 1 and 2, the service delivery network 110 consists of a data delivery device (not shown), such as a router, necessary for exchange of broadcasting contents and broadcasting service-related control information between the broadcasting service provision apparatus 100 and subscriber terminals 140.

The access node controller 120 is configured to allocate and manage resources for the broadcasting service and relay broadcasting contents, which are delivered from the broadcasting service provision apparatus 100, only to access nodes 130 in the corresponding broadcasting service area A or B.

The access nodes 130 are configured to manage connection necessary for wireless access of the subscriber terminals 140 and deliver broadcasting contents to the subscriber terminals 140 through wireless channels.

The subscriber terminals 140 are configured to make a request regarding a broadcasting service selected by subscribers, receive broadcasting contents from the broadcasting service provision apparatus 100, and display the contents to the subscribers.

Figure 3:
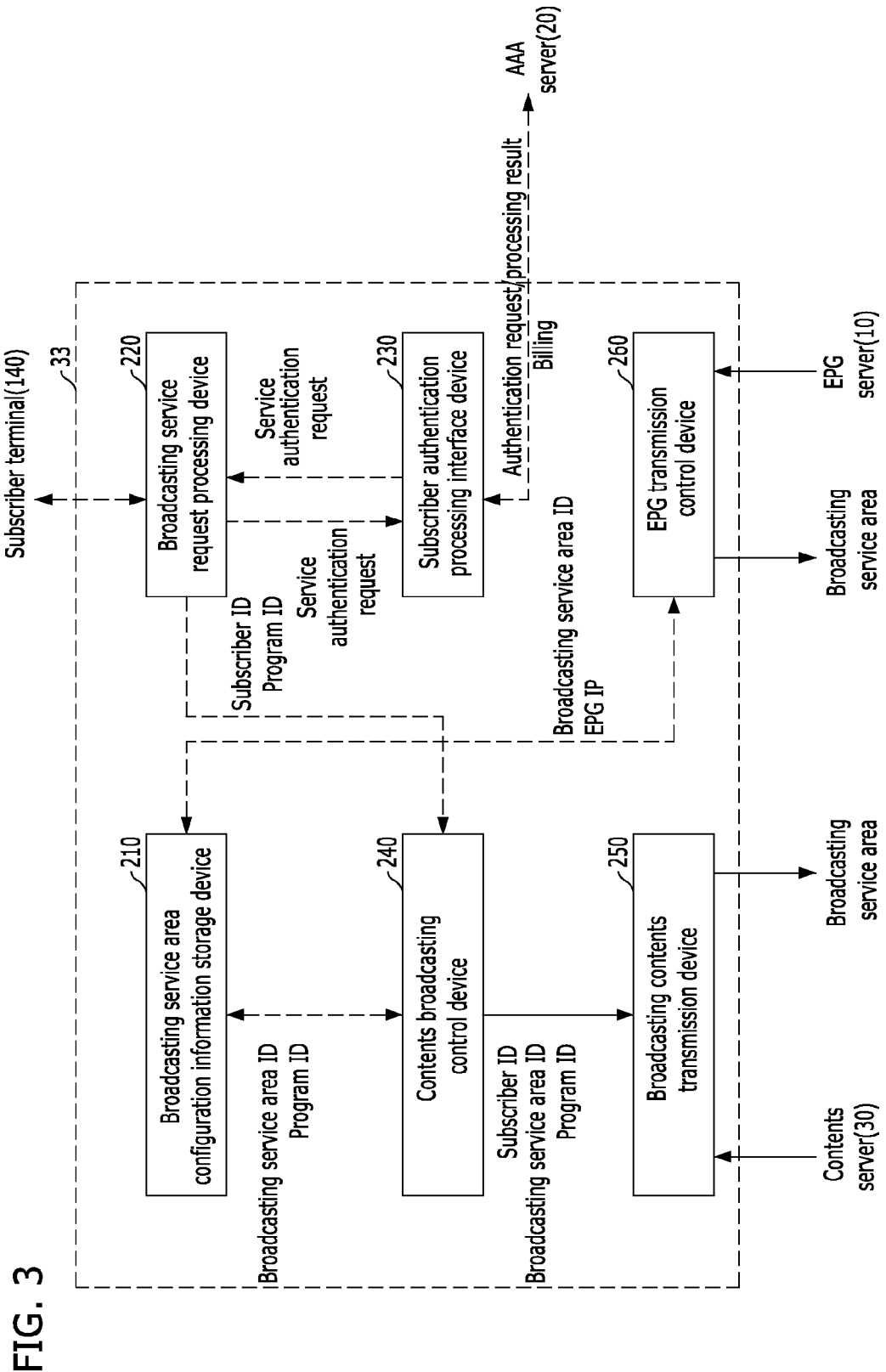
FIG. 3 is a block diagram illustrating the construction of a broadcasting service provision apparatus for different types of wireless communication systems in accordance with the present invention.

FIG. 3 is a block diagram illustrating the construction of a broadcasting service provision apparatus for different types of wireless communication systems in accordance with the present invention. Specifically, FIG. 3 illustrates detailed construction of a broadcasting service provision apparatus 100, which is configured to perform a method for providing a broadcasting service for different types of wireless communication systems by grouping wireless communication access networks, which use different wireless access technologies, into broadcasting service areas providing the same broadcasting contents and managing the areas so that a broadcasting service is provided efficiently.

Referring to FIG. 3, the broadcasting service provision apparatus 100 for different types of wireless communication systems in accordance with the present invention includes a broadcasting service area configuration information storage device 210, a broadcasting service request processing device 220, a subscriber authentication processing interface device 230, a contents broadcasting control device 240, a broadcasting contents transmission device 250, and an EPG transmission control device 260.

The broadcasting service area configuration information storage device 210 is configured to store access node IDs of wireless access networks, broadcasting service area IDs, and connection-related information regarding broadcasting programs and the like in broadcasting service areas.

The broadcasting service request processing device 220 is configured to receive and process a broadcasting service initiation request sent from a subscriber terminal 140. The subscriber authentication processing interface device 230 is configured to perform authentication regarding a broadcasting service requested by the subscriber terminal 140. The contents broadcasting control device 240 is configured to control transmission of a broadcasting service when authentication has been successfully finished.

The broadcasting contents transmission device 250 is configured to transmit broadcasting contents to the subscriber terminal 140 under the control of the broadcasting service provision apparatus 100. The EPG transmission control device 260 is configured to broadcast information regarding broadcasting programs, which are to be broadcasted in respective broadcasting service areas, and channels, e.g. EPG (Electronic Program Guide).

Figure 4:
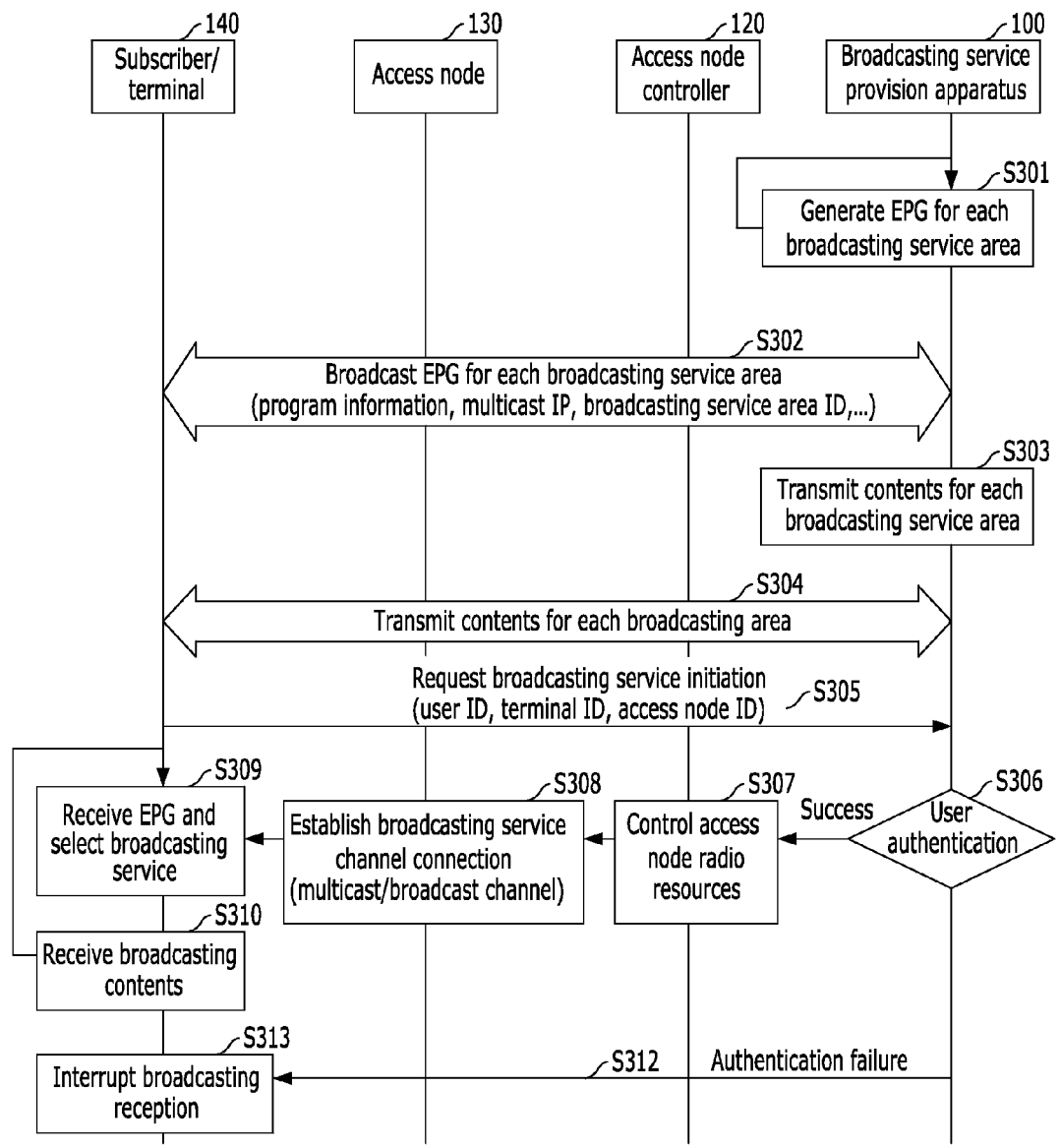
FIG. 4 is a control flowchart showing a method for providing a broadcasting service for different types of wireless communication systems, which is performed under the control of the broadcasting service provision apparatus of FIG. 3.

A method for providing a broadcasting service for different types of wireless communication systems in accordance with an embodiment of the present invention will now be described in detail with reference to FIGS. 1 to 3, which have previously been referred to, as well as FIG. 4, which is a control flowchart showing a method for providing a broadcasting service for different types of wireless communication systems, which is performed under the control of the broadcasting service provision apparatus of FIG. 3.

It will be assumed in the following description of a method for providing a broadcasting service for different types of wireless communication systems in accordance with an embodiment of the present invention that EPG information and broadcasting contents have already been provided, prior to a broadcasting service request of a subscriber, to a broadcasting service area (broadcasting area A or B) to which the subscriber terminal 140 belongs.

The EPG information and broadcasting contents are either broadcasted all the time regardless of requests of subscribers in the broadcasting service area or initiated by a user who makes the first request for a service regarding broadcasting contents. In this connection, it will be assumed in the following description of an embodiment of the present invention that the EPG information and broadcasting contents are broadcasted all the time regardless of requests of subscribers in the broadcasting service area.

The EPG transmission control device 260 of the broadcasting service provision apparatus 100 receives EPG information, which is to be used in the corresponding broadcasting service area, from the EPG server 10 positioned outside the broadcasting service provision apparatus 100, and modifies and generates EPG information in a type suited to the service delivery network 110 at step S301. The EPG information modified and generated by the EPG transmission control device 260 includes broadcasting program information, multicast IPs, broadcasting service area IDs, and the like. The EPG transmission control device 260 transmits the EPG information to an access node controller 120, which is designated by the broadcasting service area configuration information storage device 210.

The access node controller 120 relays the EPG information to an access node 130, which is to use the received EPG information, among a number of wireless access nodes 130 under its management. The wireless access node 130 converts the received EPG information to a data format recognizable by the subscriber terminal 140, and broadcasts the EPG information to the subscriber terminal 140 at step S302. The channel loaded with the EPG information is accessible by all wireless terminals.

After the EPG information has been broadcasted, contents are transmitted to the broadcasting service area by the broadcasting contents transmission device 250 of the broadcasting service provision apparatus 100 at step S303. The type of contents to be provided to the corresponding broadcasting service area is determined by the contents broadcasting control device 240 based on information recorded in the broadcasting service area configuration information storage device 210.

The contents broadcasting control device 240 controls the broadcasting contents transmission device 250 so as to transmit contents, which have been confirmed based on information recorded in the broadcasting service area configuration information storage device 210, to the broadcasting service area where the service request has occurred. The broadcasting contents transmission device 250 receives designated broadcasting contents from the contents server 30 and delivers them to the broadcasting service area through the service delivery network 110 at step S304.

The subscriber terminal 140 transmits a message (subscriber ID, terminal ID, access node ID) containing a broadcasting service initiation request to the access node controller 120, which forwards the broadcasting service initiation request message to the broadcasting service provision apparatus 100.

The broadcasting service request processing device 220 of the broadcasting service provision apparatus 100 delivers the subscriber ID and the terminal ID contained in the broadcasting service initiation request message received from the access node controller 120, as well as authentication request information regarding the type of requested service, to the subscriber authentication processing interface device 230. After receiving the authentication request information, the subscriber authentication processing interface device 230 performs an authentication function with an AAA (Authentication, Authorization, Account) server 20 at step S306.

In the case of successful authentication of the service request of the subscriber terminal 140, the subscriber authentication processing interface device 230 feeds back the result to the broadcasting service request processing device 220, which also informs the subscriber terminal 140 and the contents broadcasting control device 240 of the feedback result. When feedback information regarding successful authentication arrives, the access node controller 120 allocates a message, which allows radio resource allocation for wireless channel connection establishment of the subscriber terminal 140, to the access node 130, and starts resource management for channel management of the subscriber terminal 140 at step S307.

The access node 130 delivers, under instruction of its access node controller 120, wireless channel connection ID information, which enables access to EPG information and broadcasting contents information, to the subscriber terminal 140 so as to establish broadcasting service channel connection at step S308. As a result, the subscriber terminal 140 uses the wireless channel connection ID information received from the access node 130 to select desired contents at step S309 and receive actual broadcasting contents at step S310.

When authentication of the service request of the subscriber terminal 140 has failed at the step S306, the subscriber authentication processing interface device 230 informs the subscriber terminal 140 of the authentication failure at step S312, and the subscriber terminal 140 stops broadcasting reception at step S313.

Figure 5:
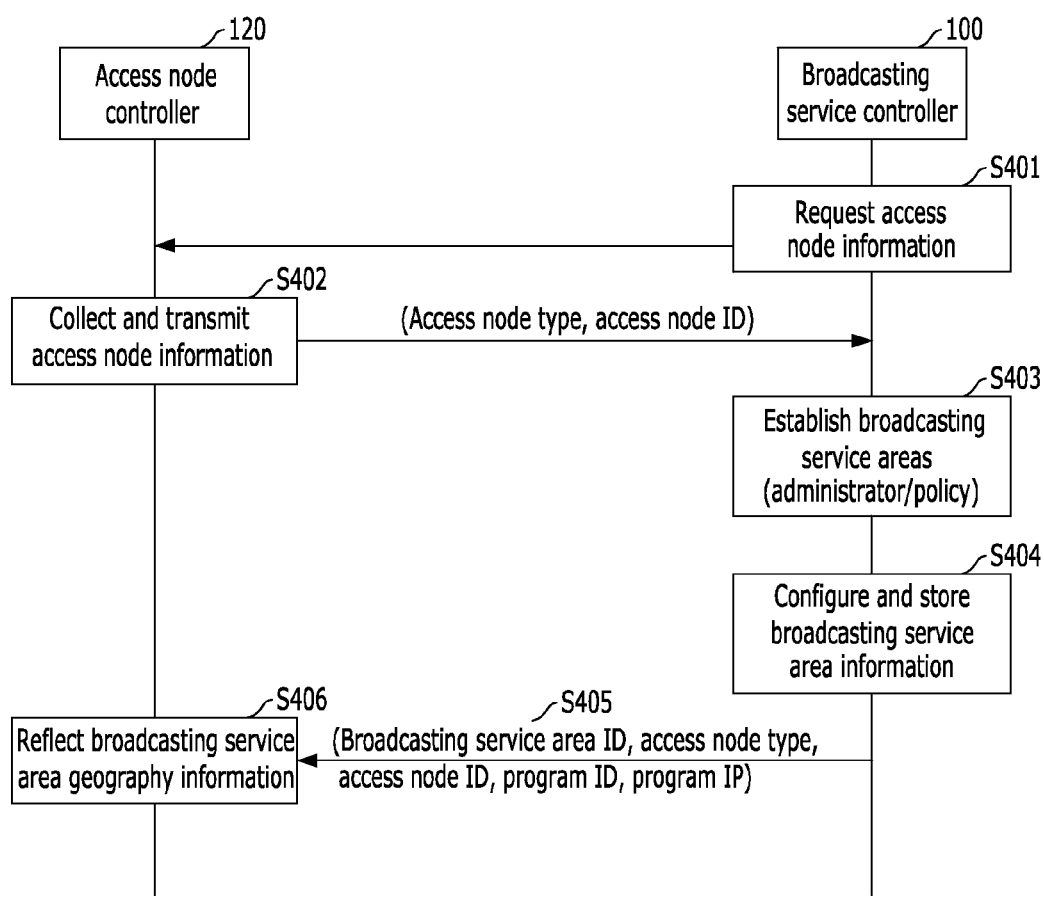
FIG. 5 is a control flowchart showing a procedure of configuring broadcasting service areas for different types of wireless communication systems performed under the control of the broadcasting service provision apparatus of FIG. 3.

A method for configuring broadcasting service areas proposed by a method for providing a broadcasting service for different types of wireless communication systems in accordance with an embodiment of the present invention will now be described with reference to FIGS. 1 to 3, which have already been referred to, and FIG. 5, which is a control flowchart showing a procedure of configuring broadcasting service areas for different types of wireless communication systems performed under the control of the broadcasting service provision apparatus of FIG. 3.

The broadcasting service provision apparatus 100 sends a request for information regarding access nodes 130, to which a service can be provided when initial configuration or readjustment of broadcasting areas is necessary, to the access node controller 120 at step S401. The access node controller 120, at the request of the broadcasting service provision apparatus 100, collects the ID of access nodes 130 under its management and the type of wireless access technology of the access nodes 130, and delivers the collected information to the broadcasting service provision apparatus 100 at step S402.

The broadcasting service provision apparatus 100 collects information received from all access node controllers 120 under its management. The information collected by the broadcasting service provision apparatus 100 may be classified for each broadcasting service area by the system administrator; alternatively, broadcasting services areas may be configured and established automatically according to a predetermined policy at step S403.

Figure 6:
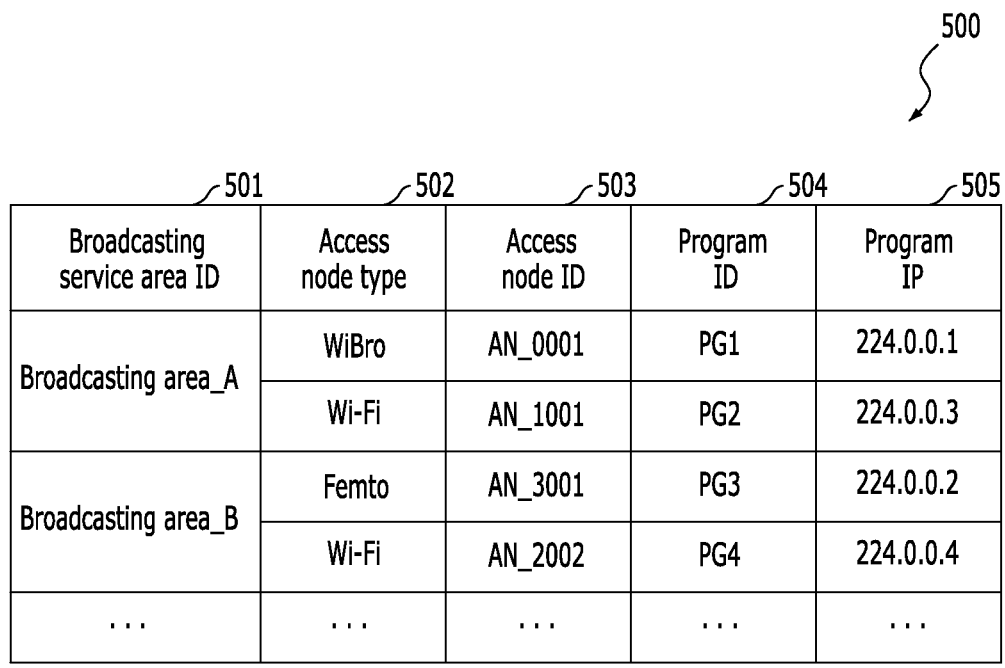
FIG. 6 is a table of information regarding broadcasting service area configuration proposed by a method and an apparatus for providing a broadcasting service in different types of wireless communication systems in accordance with the present invention.

The information regarding broadcasting service areas configured and established at the step S403 is configured as broadcasting service area configuration information 500, as shown in the table of FIG. 6, and stored in the broadcasting service area configuration information storage device 210 at step S404.

FIG. 6 is a table of information regarding broadcasting service area configuration proposed by a method and an apparatus for providing a broadcasting service for different types of wireless communication systems in accordance with the present invention. Specifically, the broadcasting service area ID 501 of the broadcasting service area configuration information 500 refers to an identification value indicating a broadcasting area, where a number of access nodes 130 are grouped to provide the same contents at the same time.

The access node type 502 refers to a predetermined value corresponding to wireless access technology used by an access node 130 belonging to a specific broadcasting service area, and the broadcasting service provision apparatus 100 can use this information and predict the quality of contents to be provided.

The access node ID 503 refers to a value for identifying an access node 130 included in a specific broadcasting service area, i.e. a value specific to each access node 130.

Referring to FIG. 5 again, the access node ID 503 is, in order for the access node controller 120 to identify access nodes 130 belonging to a specific broadcasting service area among a number of access nodes 130 under its management, is transferred from the broadcasting service provision apparatus 100 to the access node controller 120 together with the broadcasting service area ID 501 after broadcasting service area establishment at step S405.

Besides the above-mentioned broadcasting service area ID 501, access node type 502, and access node ID 503, the program (contents) ID 504 refers to information for identifying broadcasting contents provided to the corresponding broadcasting service area. This information is also included in the EPG, and the subscriber terminal 140 can identify specific contents using the program (contents) ID information included in the EPG.

The program IP 505 refers to a delivery address used to deliver respective programs (contents) to the subscriber terminal 140 and, in the case of broadcasting contents, generally uses a multicast IP address. Use of a multicast router in the service delivery network 110 guarantees efficient delivery of contents, which has multicast IP addresses, to the subscriber terminal 140.

In accordance with the exemplary embodiments of the present invention, the method and apparatus for providing a broadcasting service for different types of wireless communication systems configure access nodes using different wireless access technologies as a broadcasting service area so that broadcasting service providers can use their own wireless access networks of various types to provide broadcasting services of various levels of quality in a larger area.

Furthermore, broadcasting service subscribers can freely select and use broadcasting contents, which are delivered through various interfaces, based on the quality or price.

In addition, broadcasting service areas are established regardless of wireless access technologies employed by wireless access networks, and broadcasting contents are provided in respective broadcasting service areas established in this manner, so that the same broadcasting service is provided in different types of wireless access systems at a reduced cost.

While the present invention has been described with respect to the specific embodiments, it will be apparent to those skilled in the art that various changes and modifications may be made without departing from the spirit and scope of the invention as defined in the following claims.

What is claimed is:

1. An apparatus for providing identical broadcasting contents to different types of wireless communication access networks using different wireless access technologies, comprising:
    a contents broadcasting control device configured to identify a broadcasting service area in which a subscriber terminal is located, based on a broadcasting service request of the subscriber terminal, and broadcasting contents corresponding to the broadcasting service area and to control transmission of the broadcasting contents using address information for delivery of the broadcasting contents;
    a broadcasting service area configuration information storage device configured to store predetermined broadcasting service area information; and
    a broadcasting contents transmission device configured to transmit the broadcasting contents to the subscriber terminal, wherein
    the broadcasting service area is classified with a plurality of access nodes included in the different types of wireless communication access networks using different wireless access technologies, the plurality of access nodes being grouped together regardless of the wireless access technologies, and
    the predetermined broadcasting service area information includes at least identification information of the broadcasting service area, each of the plurality of access nodes included in the broadcasting service area, and wireless access technology of each of the plurality of access nodes,
    the broadcasting contents are identically transmitted through all the plurality of access nodes included in the broadcasting service area.

2. The apparatus of claim 1, further comprising:
    a broadcasting service information transmission control device configured to broadcast information regarding broadcasting programs to be broadcasted to each broadcasting service area and channels.

3. A method for providing broadcasting contents by a broadcasting service provision device configured to provide identical broadcasting contents to different types of wireless communication access networks using different wireless access technologies, comprising:
    modifying and generating an EPG information received from an external EPG server into a type suited to a service delivery network, and broadcasting the EPG information to the corresponding broadcasting service area, wherein the EPG information is to be used in a corresponding broadcasting service area;
    transmitting the broadcasting contents, through a plurality of access nodes included in the different types of wireless communication access networks using different wireless access technologies, the plurality of access nodes included in the corresponding broadcasting service area, to the corresponding broadcasting service area according to predetermined broadcasting service area information;
    receiving an initiation request message regarding a broadcasting service from a subscriber terminal, and delivering the EPG information and wireless channel connection ID information enabling access to the broadcasting contents to the subscriber terminal; and
    selecting the broadcasting contents as desired, by the subscriber terminal, using the wireless channel connection ID information and receiving the broadcasting contents, wherein the broadcasting service area is classified with the plurality of access nodes included in the different types of wireless communication access networks using different wireless access technologies, the plurality of access nodes being grouped together regardless of the wireless access technologies, and the predetermined broadcasting service area information includes at least identification information of the broadcasting service area, each of the plurality of access nodes included in the broadcasting service area, and wireless access technology of each of the plurality of access nodes, the broadcasting contents are identically transmitted through all the plurality of access nodes included in the broadcasting service area.

4. The method of claim 3, wherein the generated EPG information is broadcasted to the subscriber terminal through a predetermined access node controller and access nodes in the corresponding broadcasting service area.

5. The method of claim 3, wherein the EPG information comprises broadcasting program information, a multicast IP, and a broadcasting service area ID.

6. The method of claim 3, wherein said transmitting the broadcasting contents to the corresponding broadcasting service area comprises;
determining the type of contents to be provided to the corresponding broadcasting service area based on information recorded in a broadcasting service area configuration information storage device;
transmitting broadcasting contents confirmed based on the information recorded in the broadcasting service area configuration information storage device to the corresponding broadcasting service area in which a service request has occurred; and
receiving the confirmed broadcasting contents from an external contents server and transmitting the contents to the corresponding broadcasting service area through the service delivery network.

7. A method for providing identical broadcasting contents to different types of wireless communication access networks using different wireless access technologies, comprising:
modifying and generating an EPG information received from an external EPG server into a type suited to a service delivery network, broadcasting the EPG information to a corresponding broadcasting service area through the service delivery network, and transmitting broadcasting contents, through a plurality of access nodes included in the different types of wireless communication access networks using different wireless access technologies, the plurality of access nodes included in the corresponding broadcasting service area, to the corresponding broadcasting service area according to predetermined broadcasting service area information, wherein the EPG information is to be used in a corresponding broadcasting service area;
receiving, by a subscriber terminal supposed to receive the broadcasting contents, the EPG information and broadcasting contents information, generating an initiation request message regarding the broadcasting service, and transmitting the initiation request message to the broadcasting service provision device; and
establishing broadcasting service channel connection to the subscriber terminal when the broadcasting service provision device receives the initiation request message regarding the broadcasting service, wherein
the broadcasting service area is classified with the plurality of access nodes included in the different types of wireless communication access networks using different wireless access technologies, the plurality of access nodes being grouped together regardless of the wireless access technologies, and the predetermined broadcasting service area information includes at least identification information of the broadcasting service area, each of the plurality of access nodes included in the broadcasting service area, and wireless access technology of each of the plurality of access nodes, the broadcasting contents are identically transmitted through all the plurality of access nodes included in the broadcasting service area.

8. The method of claim 7, wherein the broadcasting service provision device, when receiving the broadcasting service initiation request message from the subscriber terminal, delivers the EPG information and wireless channel connection ID information enabling access to the broadcasting contents to the subscriber terminal through the service delivery network so that broadcasting service channel connection can be established.

9. The method of claim 8, wherein said establishing broadcasting service channel connection to the subscriber terminal when the broadcasting service provision device receives the initiation request message regarding the broadcasting service comprises:
allocating, by the access node controller, a message allowing radio resource allocation for wireless channel connection establishment of the subscriber terminal to an access node and starting resource management for channel management of the subscriber terminal; and
delivering, by the access node, the EPG information and wireless channel connection ID information enabling access to the broadcasting contents to the subscriber terminal under the control of the access node controller so that broadcasting service channel connection is established.

10. The method of claim 7, wherein the broadcasting service initiation request message comprises a subscriber ID, a terminal ID, and an access node ID.

11. A method for configuring a broadcasting service area by a broadcasting service provision device configured to provide identical broadcasting contents to different types of wireless communication access networks using different wireless access technologies, comprising:
requesting, by the broadcasting service provision device, all access node controllers managed by the device to provide information regarding access nodes, to which the device can provide a service, when initial configuration or readjustment of a broadcasting service area is necessary, wherein each of the access nodes communicates with a subscriber terminal by one of the wireless access technologies;
collecting, by the access node controller, the ID of access nodes managed by the controller and the type of wireless access technology of access nodes at the request of the broadcasting service provision device and delivering the collected ID and type to the broadcasting service provision device;
establishing, by the broadcasting service provision device, a broadcasting service area automatically according to a predetermined policy based on information received from the access node controller;
configuring and storing, by the broadcasting service provision device, information regarding the established broadcasting service area; and providing, by the broadcasting service provision device, the access node controller with the configured and stored information regarding the broadcasting service area, wherein the broadcasting service area is classified with the plurality of access nodes included in the different types of wireless communication access networks using different wireless access technologies, the plurality of access nodes being grouped together regardless of the wireless access technologies, and the predetermined broadcasting service area information includes at least identification information of the broadcasting service area, each of the plurality of access nodes included in the broadcasting service area, and wireless access technology of each of the plurality of access nodes, the broadcasting contents are identically transmitted through all the plurality of access nodes included in the broadcasting service area.

12. The method of claim 11, wherein the information regarding the broadcasting service area provided to the access node controller by the broadcasting service provision device comprises:

a broadcasting service area ID indicating, by an identification value, a broadcasting area, into which a number of access nodes are grouped, and in which identical contents are provided at identical time;

an access node type indicating, by a predetermined value, wireless access technology used by an access node belonging to a specific broadcasting service area;

an access node ID indicating a value specific to each access node so that an access node belonging to a specific broadcasting service area is identified;

a program ID indicating broadcasting contents provided in a corresponding broadcasting service area; and program IP information corresponding to a delivery address for delivering respective broadcasting contents to a subscriber terminal.

\* \* \* \* \*